US008503158B2

(12) United States Patent
Liang

(10) Patent No.: US 8,503,158 B2
(45) Date of Patent: Aug. 6, 2013

(54) KEY BUTTON MECHANISM AND PORTABLE ELECTRONIC DEVICE USING SAME

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 379 days.

(21) Appl. No.: 12/899,563

(22) Filed: Oct. 7, 2010

(65) Prior Publication Data

US 2011/0235300 A1 Sep. 29, 2011

(30) Foreign Application Priority Data

Mar. 26, 2010 (CN) .......................... 2010 1 0133521

(51) Int. Cl.
*H01G 5/01* (2006.01)

(52) U.S. Cl.
USPC ........... 361/288; 361/807; 361/809; 361/810; 361/291

(58) Field of Classification Search
USPC .................. 361/288, 291; 200/343, 339, 552
See application file for complete search history.

(56) References Cited

U.S. PATENT DOCUMENTS

| | | | | |
|---|---|---|---|---|
| 6,148,183 A * | 11/2000 | Higdon et al. | ............. | 455/575.1 |
| 6,809,273 B2 * | 10/2004 | Ito et al. | ......................... | 200/5 R |
| 2007/0120821 A1 * | 5/2007 | Lee et al. | ....................... | 345/156 |
| 2009/0020402 A1 * | 1/2009 | Ichikawa et al. | .............. | 200/341 |
| 2009/0301854 A1 * | 12/2009 | Yang et al. | ..................... | 200/343 |
| 2010/0219057 A1 * | 9/2010 | Okuzumi | ...................... | 200/5 A |

* cited by examiner

*Primary Examiner* — Tuan T Dinh
*Assistant Examiner* — Steven Sawyer
(74) *Attorney, Agent, or Firm* — Altis Law Group, Inc.

(57) ABSTRACT

A key button mechanism and a portable electronic device using same are provided. The key button mechanism includes a base body, a protective piece and a key button. The protective piece is assembled to the base body and includes two actuating portions. The key button is partially attached to the base body and aligns with the protective piece. The key button includes a key body and two resisting blocks formed on the key body. The two resisting blocks are configured to align with and abut against the corresponding two actuating portions of the protective piece.

11 Claims, 5 Drawing Sheets

KEY BUTTON MECHANISM AND PORTABLE ELECTRONIC DEVICE USING SAME

BACKGROUND

1. Technical Field

This disclosure relates to key button mechanisms, particularly to a key button mechanism used in a portable electronic device.

2. Description of Related Art

Portable electronic devices such as mobile phones may have housings that receive printed circuit boards (PCBs). The mobile phone usually includes a key button mechanism such as imaging key button mechanism or a volume control key button mechanism on the side of the housing for a convenient control of the mobile phone. However, the key button mechanism can be complex in structure and not easy to use.

Therefore, there is a room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary key button mechanism and portable electronic device using same. Moreover, in the drawings like reference numerals designate corresponding parts throughout the several views. Wherever possible, the same reference numerals are used throughout the drawings to refer to the same or like elements of an embodiment.

DETAILED DESCRIPTION

The key button mechanism is assembled to one side portion of a portable electronic device such as a mobile telephone, for controlling or operating the portable electronic device conveniently as a function key. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers or keyboard-based handheld devices, remote control units, and portable media players (such as an MP3 or DVD player). Accordingly, any reference herein to the mobile telephone should also be considered to apply equally to other portable electronic devices.

Figure 1:
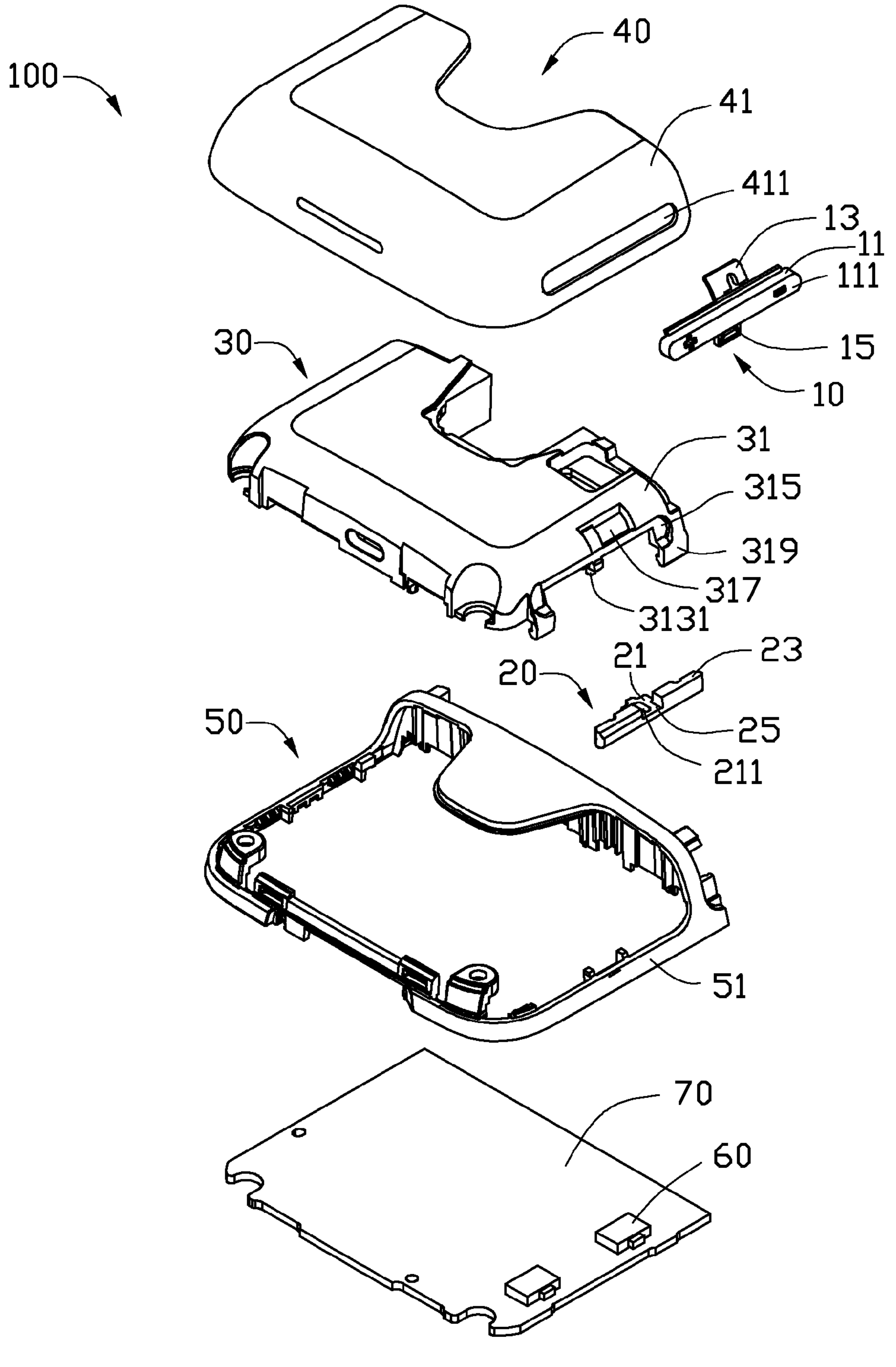
FIG. 1 is an exploded perspective view of an exemplary embodiment of a portable electronic device, including a key button mechanism, a housing, a frame, two switches and a circuit board.
Figure 2:
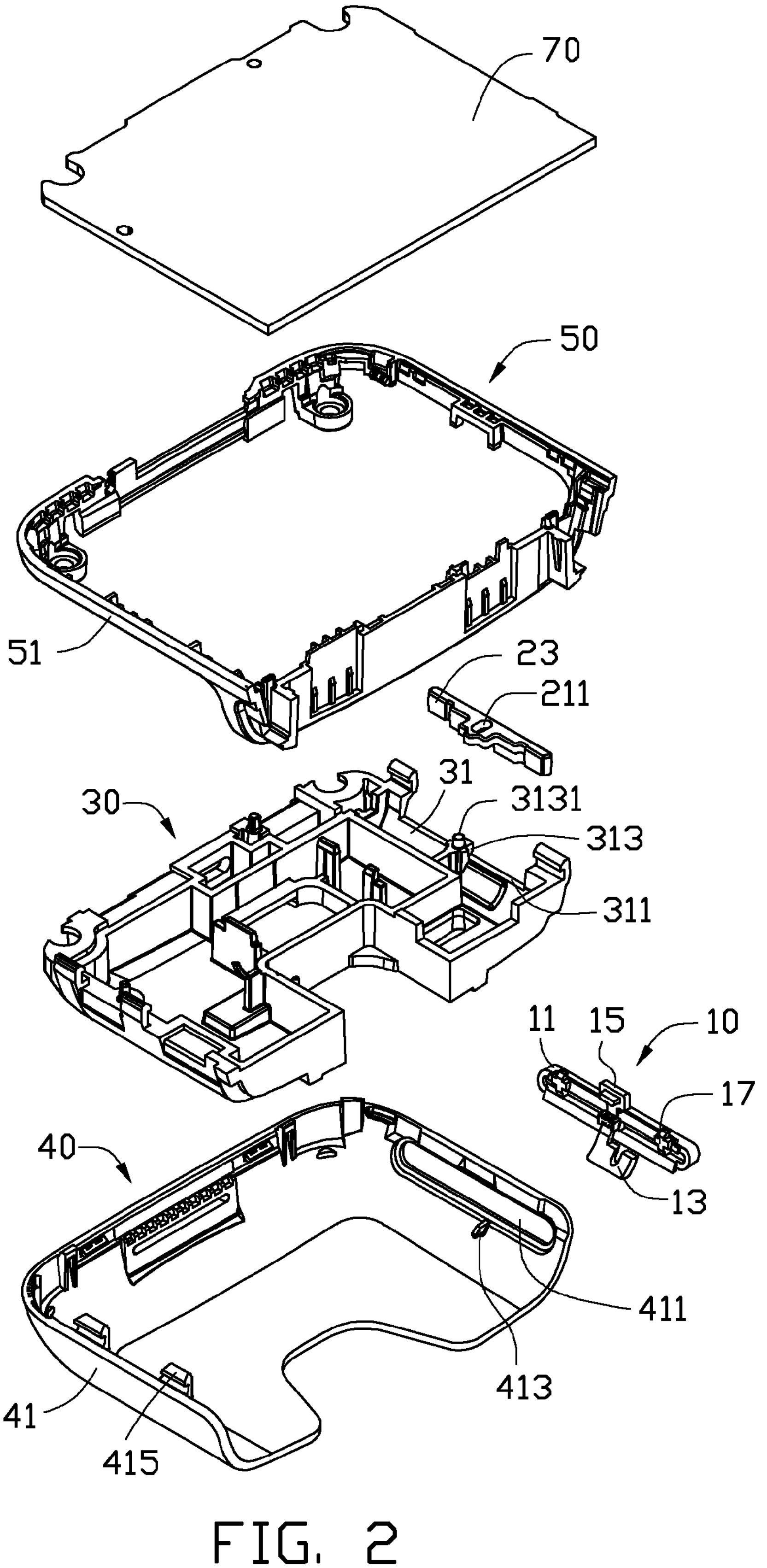
FIG. 2 is another exploded partial perspective view of the portable electronic device shown in FIG. 1.

FIGS. 1 and 2 show an exemplary embodiment of a portable electronic device 100 including a key button mechanism (not labeled), a housing 40, a frame 50, two switches 60, and a circuit board 70. The key button mechanism incorporates a key button 10, a protective piece 20, and a base body 30. The housing 40 and the frame 50 are respectively attached to two opposite sides of the base body 30, and are latched to each other. The protective piece 20 is assembled to the base body 30. The key button 10 is mounted to the housing 40, and is attached to the base body 30, and is aligned with the protective piece 20. The circuit board 70 is assembled to the base body 30 and is enclosed within the frame 50. The two switches 60 are electrically mounted on the circuit board 70 and positioned spaced from each other. The two switches 60 can be triggered by pressing the key button 10 and protective piece 20 to transmit an electric control signal to the circuit board 70.

Figure 3:
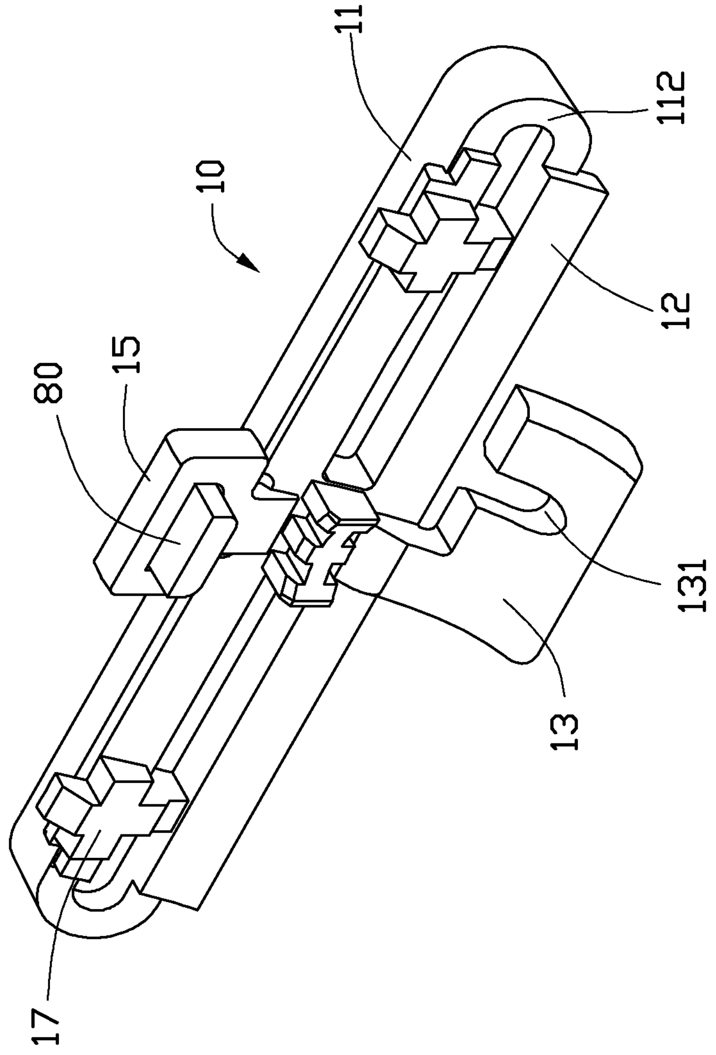
FIG. 3 is a perspective view of the key button, in accordance with an exemplary embodiment.
Figure 4:
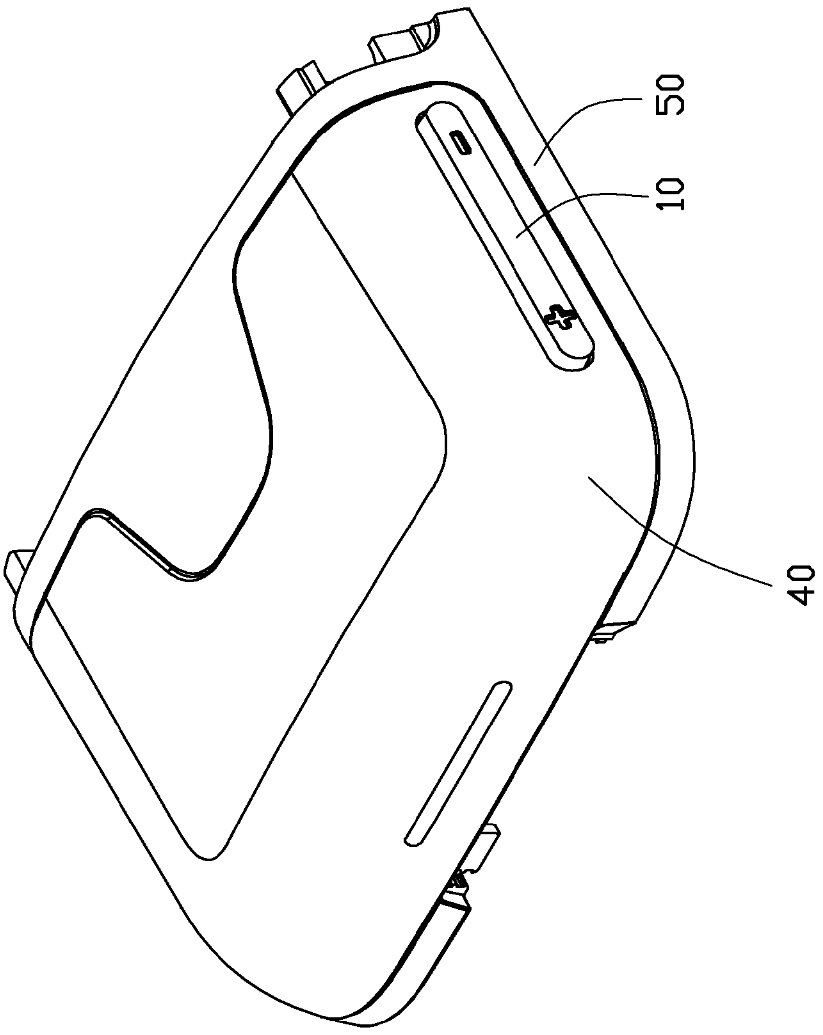
FIG. 4 is an assembled perspective view of the portable electronic device shown in FIG. 1.

Also referring to FIG. 3, the key button 10 includes a key body 11, two resisting walls 12, an elastic arm 13, an assembling protrusion 15 and two resisting blocks 17. The key body 11 includes a pressing surface 111 and a resisting surface 112 opposite to the pressing surface 111. The pressing surface 111 may be engraved, embossed, or otherwise labeled with indicia, such as a "+" character and a "–" character adjacent to opposite ends thereof (shown in FIG. 1). The two resisting walls 12 are integrally formed with the key body 11 by extending respectively backward from two opposite sides of the resisting surface 112. The key body 11 is made of a rigid plastic material such as polycarbonate. The elastic arm 13 and the assembling protrusion 15 are formed and located at two opposite sides of the key body 11. The elastic arm 13 is substantially L-shaped and extends from a substantially middle portion of one resisting wall 11. The elastic arm 13 provides a return force to the key button 10 when the key button 10 is pressed. A positioning hole 131 is defined through the elastic arm 13 to communicate with the gap.

The assembling protrusion 15 protrudes from the other resisting wall 11 opposite to the elastic arm 13. The assembling protrusion 15 can be fixed to the housing 40 with a fused block 80. The two resisting blocks 17 protrude from the resisting surface 112 of the key body 11 from the pressing portion 111 and are located adjacent to the two opposite ends of the key body 11. The two resisting blocks 17 can resist against the protective piece 20 to control the corresponding two switches 60 of the circuit board 70, to trigger and generate an electric control signal transmitted to the circuit board 70 for controlling the portable electronic device 100.

Figure 5:
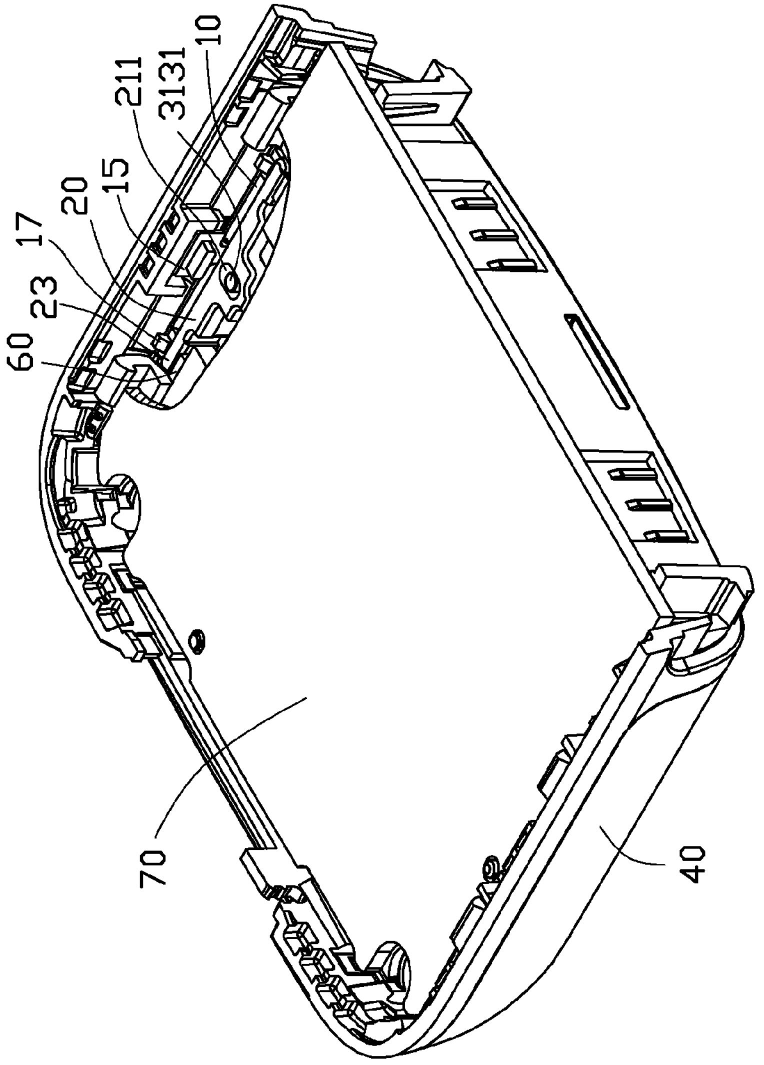
FIG. 5 is similar to FIG. 4, but viewed from another aspect.

Also referring to FIG. 5, the protective piece 20 is assembled to the base body 30 and is located between the key button 10 and the two switches 60. The protective piece 20 protects the switches 60 and prevents the key button 11 from being over pressed. The protective piece 20 includes a hinged portion 21 and two actuating portions 23. The two actuating portions 23 extend backward from two opposite ends of the hinged portion 21 corresponding to the two switches 60 and the two resisting blocks 17 of the key button 10. The two actuating portions 23 and the hinged portion 21 cooperate to form a substantially U-shaped accommodating space 25. A substantially elliptical hinged hole 211 is defined through the hinged portion 21 to communicate with the accommodating space 25. The two actuating portions 23 of the protective piece 20 are pressed by the corresponding two resisting blocks 17 of the key button 10, to trigger the corresponding two switches 60 of the circuit board 70, to generate an electric control signal transmitted to the circuit board 70.

Referring to FIGS. 1 and 2, the base body 30 includes a side wall 31. A cut out 311 is defined through the side wall 31 for receiving the protective piece 20. A projection 313 protrudes from an inner surface of the side wall 31 and is located adjacent to the substantially middle portion of the cut out 311 corresponding to the accommodating space 25 of the protective piece 20. The projection 313 includes a rotating post 3131 extended for hinging the protective piece 20. An accommodating groove 315 is recessed from an outer surface of the side wall 31 corresponding to the key body 11 of the key button 10 and communicates with the cut out 311. When pressing the key button 10, the key body 11 is pressed and runs into the accommodating groove 315 to resist against the protective piece 20 assembled within the cut out 311 of the base body 30. A resisting slot 317 is recessed from the outer surface of the side wall 31 adjacent to the accommodating groove 315 to receive the elastic arm 13 of the key button 10. As the key button 10 is pressed, the elastic arm 13 may resist against the bottom wall of the resisting slot 317 to generate an elastic force for enabling the key button 10 to return to its original position relative to the base body 30 when the key button 10 is released. Two latching blocks 319 are formed at two ends of the side wall 31 and located adjacent to the respective two ends of the cut out 311. The two latching blocks 319 latch the circuit board 70 with the base body 30.

The housing 40 includes two substantially parallel lateral walls 41. A receiving hole 411 is defined through one lateral wall 41 and receives the key body 11 of the key button 10. A fixture block 413 protrudes from an inner surface of the lateral wall 41 and positioned adjacent to the receiving hole 411 corresponding to the positioning hole 131 of the elastic arm 13 of the key button 10. In assembly, the fixture block 413 passes through the positioning hole 131 of the elastic arm 13 to mount and locate the key button 10 to the housing 40. At least one latching hook 415 protrudes from the inner surface of the opposite other lateral wall 41 and is positioned opposite to the receiving hole 411. The frame 50 is assembled to the base body 30 and latches with the housing 40. The frame 50 includes a latching border 51 latching with the latching hook 415 of the housing 40.

During assembly, the protective piece 20 is inserted into and assembled within the cut out 311 of the base body 30. The rotating post 3131 passes through the hinged hole 211. The projection 313 received within the corresponding accommodating space 25. The protective piece 20 is hinged to the base body 30 and is accommodated within the cut out 311. After that, the two switches 60 are electrically mounted to the circuit board 70 and are positioned spaced from each other corresponding to the two actuating portions 23. The circuit board 70 is assembled to the base body 30, aligning the two switches 60 with the two actuating portions 23. The two latching blocks 319 of the side wall 31 are tightly latched to the circuit board 70. The frame 50 is assembled to the base body 30. The key body 10 is assembled to the housing 40, and the key body 11 is received within the receiving hole 411 and is exposed to the outer side of the housing 40. The two resisting walls 12 of the key button 10 accordingly abut against the inner surface of the lateral wall 41. The fixture block 413 of the inner surface of the housing 40 passes through the positioning hole 131 of the elastic arm 13. The assembled housing 40 is mounted to the base body 30. The two resisting blocks 17 align the two actuating portions 23 of the protective piece 20. The elastic arm 13 is accordingly received within the resisting slot 317 and resists against the bottom wall of the slot 317.

In use, when pressing the "+" character or "–" character of the pressing portion 111 of the key body 11, the corresponding one resisting block 17 of the key button 10 is pushed to move towards and resist against the corresponding one actuating portion 23 of the protective piece 20. Meanwhile, the corresponding one end of the protective piece 20 is pushed to rotate along with rotating post 3131 to touch the corresponding switch 60. The switch 60 is triggered to generate an electric control signal to the circuit board 70. The elastic arm 13 of the key button 10 is distorted to generate an elastic force. When the key body 11 is released, the key body 11 automatically returns to its original position by the elastic force generated by the elastic arm 13. The protective piece 20 rotates relative to the rotating post 3131 and returns to its original position.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A key button mechanism, comprising:

a base body;

a protective piece assembled to the base body and comprising two actuating portions; and a key button partially attached to the base body and aligning with the protective piece; the key button comprising a key body, an elastic arm and two resisting blocks, the elastic arm formed on the key body and positioned on the base body for providing a returning force to the key button as the key button is pressed in use; the two resisting blocks respectively positioned at two sides of the elastic arm and configured to align with and abut against the corresponding two actuating portions of the protective piece;

wherein the base body includes a side wall, a cut out defined through the side wall, and an accommodating groove recessed from an outer surface of the side wall and communicating with the cut out; the protective piece is received within the cut out of the base body; the key button is attached to and partially accommodated within accommodating groove of the base body;

the base body further includes a post formed on the base body and located adjacent to the cut out; the protective piece further includes a hinged portion positioned between the two actuating portions, the hinged portion defines a hinged hole and is hinged to the post of the base body;

the two actuating portions and the hinged portion cooperate to form an accommodating space; a projection protrudes from an inner surface of the side wall and is configured corresponding to the accommodating space of the protective piece, the post extends from the projection.

2. The key button mechanism as claimed in claim 1, wherein the key body includes a pressing surface and an opposite resisting surface, the key button further includes two resisting walls integrally formed with the key body by extending out backward from two opposite sides of the resisting surface, the two resisting wall are configured for facilitating locating the key button.

3. The key button mechanism as claimed in claim 2, wherein the pressing surface includes indicia adjacent to opposite ends thereof.

4. The key button mechanism as claimed in claim 2, wherein the base body further includes a resisting slot recessed from the outer surface of the side wall adjacent to the accommodating groove, the elastic arm extends from one of the resisting walls of the key body, the elastic arm is received within the corresponding resisting slot and resists against the bottom wall of the.

5. The key button mechanism as claimed in claim 4, wherein the base body further includes two latching blocks formed at two ends of the side wall and located adjacent to the respective two ends of the cut out.

6. The key button mechanism as claimed in claim 4, wherein the key button further includes an assembling protrusion protruding out from the other of the resisting walls opposite to the corresponding elastic arm and configured to be fixed to a housing by a fused block.

7. A portable electronic device, comprising:

a key button mechanism, comprising:

a base body including a projection;

a protective piece assembled to the base body and comprising two actuating portions and a hinged portion positioned between the two actuating portions, the two actuating portions and the hinged portion cooperating to form an accommodating space, the projection received in the accommodating space; and a key button partially attached to the base body and aligning with the protective piece; the key button comprising a key body and two resisting blocks formed on the key body; the two resisting blocks configured to align with and abut against the corresponding two actuating portions of the protective piece;

a housing mounted on the base body and comprising a receiving hole defined through one lateral wall thereof and configured for receiving the key body therein;

a circuit board assembled to the base body opposite to the housing; and two switches electrically mounted on the circuit board and positioned spaced to each other and aligning with the corresponding two actuating portions of the protective piece, the two switches configured to be triggered by pressing the corresponding key button and protective piece, to generate an electric control signal transmitted to the circuit board for controlling the portable electronic device;

wherein the base body includes a side wall, a cut out defined through the side wall, and an accommodating groove recessed from an outer surface of the side wall and communicating with the cut out the protective piece is received within the cut out of the key base body; the key button is attached to and partially accommodated within accommodating groove of the base body and partially exposes from the receiving hole of the housing;

the base body further includes a post formed on the base body and located adjacent to the cut out the hinged portion defines a hinged hole and is hinged to the post of the base body;

the projection protrudes from an inner surface of the side wall, the post extends from the projection.

8. The portable electronic device as claimed in claim 7, wherein the portable electronic device further includes a frame attached to the bottom of the base body opposite to the housing and latch with the housing, the circuit board is enclosed within the frame.

9. The portable electronic device as claimed in claim 7, wherein the key body includes a pressing surface and an opposite resisting surface, the key button further includes two resisting walls integrally formed with the key body by extending out backward from two opposite sides of the resisting surface, the two resisting wall are configured for facilitating locating the key button; the pressing surface exposes from the receiving hole of the housing.

10. The portable electronic device as claimed in claim 9, wherein the pressing surface includes indicia adjacent to opposite ends thereof.

11. The portable electronic device as claimed in claim 9, wherein the base body further includes a resisting slot recessed from the outer surface of the side wall adjacent to the accommodating groove, the key button further includes an elastic arm formed and located at one side of the key body, the elastic arm is received within the corresponding resisting slot and resists against the bottom wall of the resisting slot for providing a returning force to the key button as the key button is pressed in use.

* * * * *